United States Patent [19]

Townsing

[11] Patent Number: 4,578,539
[45] Date of Patent: Mar. 25, 1986

[54] INTERROGATION DEVICE

[75] Inventor: Leslie C. Townsing, Victoria, Australia

[73] Assignee: Remote Interrogations Pty. Ltd., Victoria, Australia

[21] Appl. No.: 521,667

[22] Filed: Aug. 10, 1983

[51] Int. Cl.⁴ .......................................... H04M 11/04
[52] U.S. Cl. .................................. 179/2 A; 179/5 R; 340/505; 340/518
[58] Field of Search ................ 179/2 A, 2 AM, 5 R, 179/5 P, 2 R, 84 VF; 340/505, 518, 825.07-825.13, 825.71, 825.76, 825.16, 825.17, 825.36, 825.37

[56] References Cited

U.S. PATENT DOCUMENTS

| | | |
|---|---|---|
| 3,842,206 | 10/1974 | Barsellotti et al. ............. 179/2 AM |
| 3,962,545 | 6/1976 | Abe .................................. 179/2 AM |
| 4,085,292 | 4/1978 | Leslar et al. ..................... 179/5 R X |
| 4,162,488 | 7/1979 | Silverman et al. .............. 179/5 R X |
| 4,241,237 | 12/1980 | Paraskevakos et al. ........ 179/2 AM |

FOREIGN PATENT DOCUMENTS

1009331 4/1977 Canada .
1063270 9/1979 Canada .

Primary Examiner—W. J. Brady
Attorney, Agent, or Firm—Finnegan, Henderson, Farabow, Garrett & Dunner

[57] ABSTRACT

An interrogation unit for connecting into an installation via sensing elements connected to sense required information in the installation, said interrogation unit having signal supplying means for supplying signals indicative of the condition of each of various sensors in the installation, and trigger circuit means activatable upon receipt of a request signal to transmit said signals for each of the sensors in turn.

10 Claims, 12 Drawing Figures

FIG_11b_

INTERROGATION DEVICE

This invention relates to an interrogation unit and relates particularly but not exclusively to such for use in conjunction with a national telephone network so that the unit can be connected at a factory, for example, to monitor conditions of equipment in the factory, and so that when the factory is telephoned the unit will answer the incoming call and transmit signals along the telephone line to indicate the condition of the equipment.

Hitherto it has been a problem for businesses to implement a process which requires say twenty-four hours process time, when the staff have to go home in the evening and the factory is closed. Usually the person responsible for the process has to return to the factory at selected times to personally inspect the process and see that it is operating correctly.

The present invention has been devised to provide an interrogating unit which can transmit information concerning the process to a person at a remote location. Conveniently, this is by means of the national telephone network but it may be by means of a radio link if desired.

Therefore in accordance with a broad aspect of the present invention there may be provided an interrogation unit for connecting into an installation via sensing elements connected to sense required information in the installation, said interrogation unit having signal supplying means for supplying signals indicative of the condition of each of various sensors in the installation, and trigger circuit means activatable upon receipt of a request signal being received, to transmit said signals for each of the sensors. Preferably the signals which are transmitted are audible tone signals which are readily decipherable by the human ear but it is to be understood that the invention is sufficiently broad as to embrace transmission of signals which can be deciphered by use of deciphering apparatus.

It is most preferable that the interrogation unit have memory means for recording an initial condition of each of the sensors whereby to provide signals representative of a change having occurred at the sensors.

In order that the invention may be more clearly ascertained a preferred construction will now be described with reference to the accompanying drawings wherein.

The interrogation unit is arranged to provide information as to the condition of various sensors when it receives an incoming telephone call. Thus the interrogation unit may be accessed by a telephone anywhere in the world. The interrogation unit provides audible tones/pulses at two different frequencies which are readily discernable so as to audibly identify particular groups of sensors and particular sensors in each group. The coding pattern for identification of particular groups of sensors and particular sensors will be described later.

Lamps are provided on the unit to also give a visual indication if the sensors have changed condition.

The sensors in the preferred embodiment are typically ON/OFF type sensors but other sensors such as analog measuring sensors and/or the like may be used and different combinations of tone pulses may be provided at discrete levels of operation of such sensors to indicate that the sensors have reached particular levels of change.

The interrogation unit also has a latching feature for connection with any sensors so that it will provide a facility to memorise a previous operation of a sensor. In other words, if a sensor is at an ON position when the interrogation unit is initially activated and it is subsequently switched to an OFF position and then back onto the ON position, the interrogation unit will be able to memorise this. An input status switch is provided so that when operated an appropriate sensor indication will be given to show the original condition of the sensors. This feature is by visual inspection of the front of the unit and is indicated by the sensor lamps being lit. Under telephoned interrogation no audible signal is given representing this. The interrogation unit also has an alarm output feature which may be used to operate alarms or start an automatic dialer to dial a predetermined telephone number during unstaffed hours if human intervention is required.

The interrogation unit uses a battery which, in turn, is charged from a mains supply. Power is therefore supplied to the interrogation unit should the mains be disconnected temporarily.

Figures 1, 2:
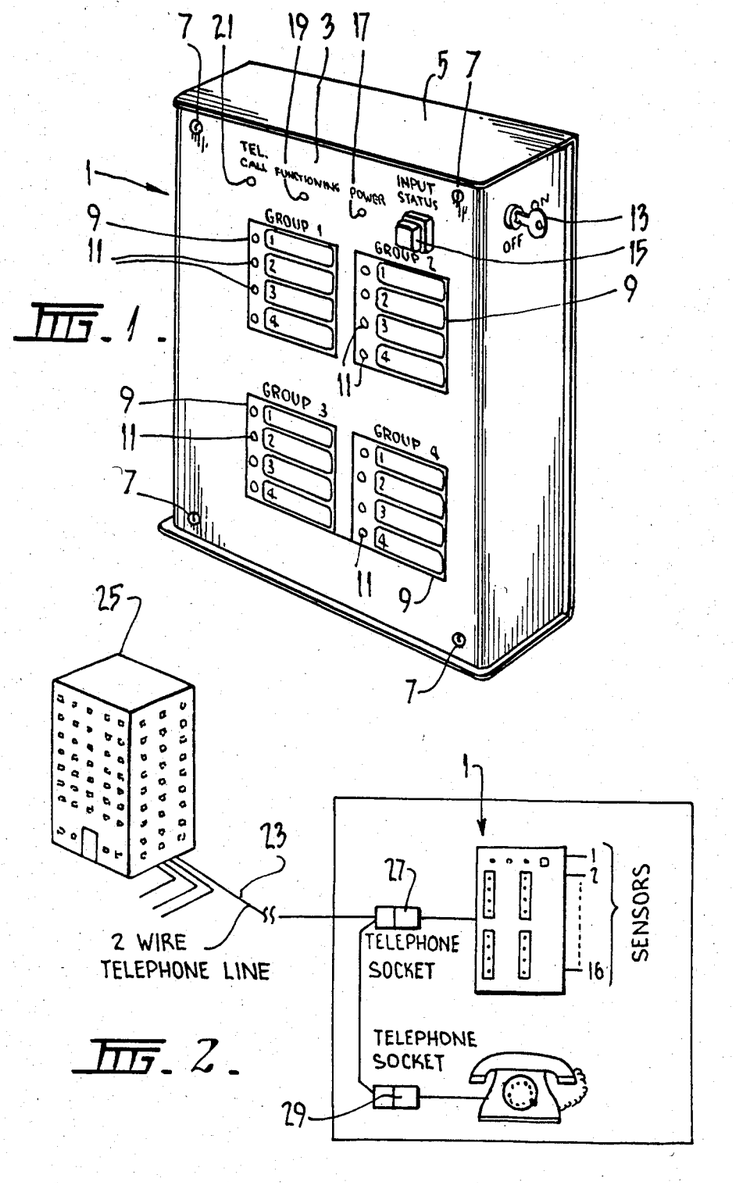
FIG. 1 is a front perspective view of an assembled interrogation unit minus sensors.
FIG. 2 is a schematic electrical connection diagram showing how the interrogation unit is connected to a telephone line and to various sensors in an installation.

FIG. 1 shows a preferred interrogation unit 1. The interrogation unit 1 has a front panel 3 which can be removed from a back panel part 5. Screws 7 hold the front part 3 to the back part 5. The back part 5 has mounting means associated therewith (not shown) for permitting attachment of the interrogation unit 1 to a wall or like surface at a desired location. The front panel 3 has four openings 9 therein through which can be viewed four respective groups of sensor indicators 11. These indicators 11 are lamps in the form of LED's. Typically therefore, the interrogation unit 1 is able to provide indications for sixteen different sensors. These may be arranged in groups to simplify recognition upon interrogation. Such indication is by both an audible indication during interrogation and by a visible indication by inspecting the indicators 11 when desired. Combinations of sensors from one or more groups may be used to indicate conditions of defined numbers of apparatus which are to be interrogated.

In each opening 9 there is provision for marking next to each of the sensor indicators 11 the particular function of the respective sensor i.e. low water, high water, heat on, heat off, conveyor on, conveyor off and the like.

At the top of the interrogation unit 1 there is provided an on/off reset switch 13. This switch is typically shown as a key operated switch. Operation of this switch from the OFF position to the ON position turns the interrogation unit 1 on and initialises a micro processor in the circuitry thereof. Operation of the switch 13 from the ON position to the OFF position simply switches the interrogation unit 1 off. If the switch 13 is switched from ON to OFF and then ON again, then the condition of any sensors is then set within memory in the interrogation unit 1 and then represent the new initial condition setting of those sensors. The input status switch 15 is provided on the front panel 3. In addition to the above, the interrogation unit 1 has a power indicator lamp 17, and a functioning indicator lamp 19. The power indicator 17 simply indicates if mains power is present. The functioning indicator 19 is used to ascertain if the interrogation unit 1 is scanning the sensors and is used simply to show that scanning is occurring. The scanning indication is by way of flashing the indicator 19. An incoming call indicator lamp 21 is also provided to indicate when illuminated that an incoming call is being processed.

Before proceeding to disclose the detailed circuitry of the interrogation unit 1, it should be appreciated that behind the front panel 3 and on one side of the unit 1 are a plurality of terminals. These terminals (not shown) are for providing connection of the telephone lines, mains power, internal battery of the system, output leads at 12 volts for use in operation of various sensors, and output terminals for an alarm signalling function or for operation of a automatic telephone dialling function.

The front panel 3 can be removed to display strapping pads for each group of sensors behind each of the openings 9. Such pads are used for providing interconnections for selecting if each sensor in each group is to provide an ALARM and/or a LATCH condition or neither condition. This will be explained later.

Referring now to FIG. 2 there is shown connection of the interrogation unit 1 to a two wire telephone line 23 which connects with a national or international telephone network 25. Plug sockets 27 and 29 permit suitable connection of the interrogation unit 1 and the telephone handset or switchboard.

Figure 3:
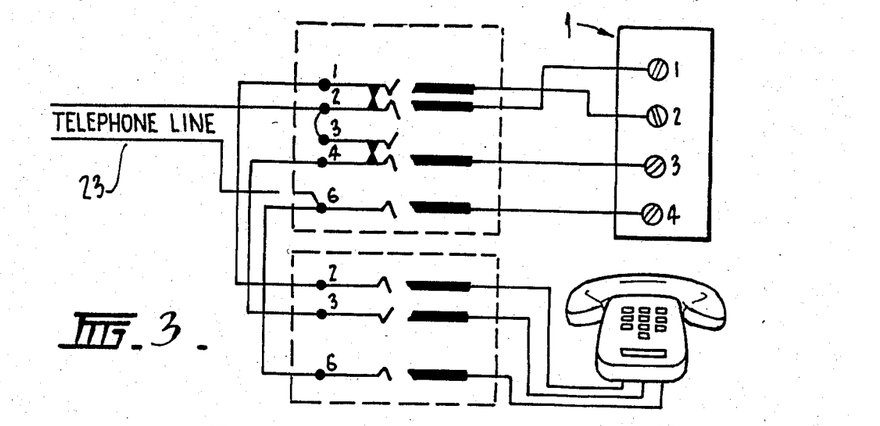
FIG. 3 is a detailed electrical connection diagram showing connection of a two wire telephone line to four input terminals of the interrogation unit.

FIG. 3 shows the detailed circuit diagram for connection of the two wire telephone line 23 to the interrogation unit 1 and to the telephone handset. The connection shown in FIG. 3 is known in Australia, by Telecom, as MODE 25.

Figure 4:
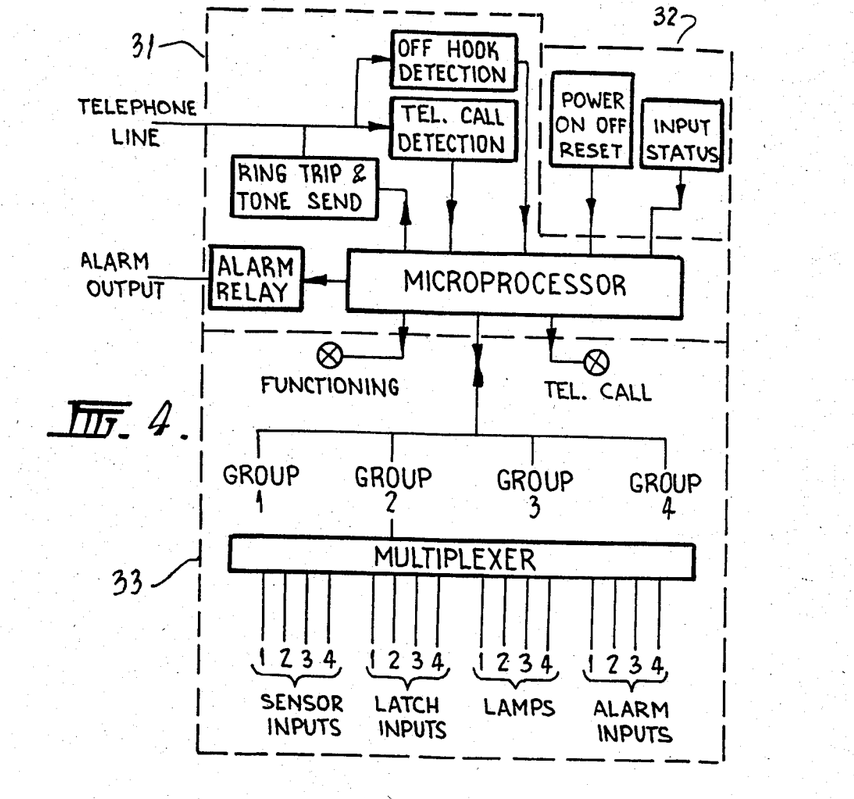
FIG. 4 is an electrical block circuit diagram of the interrogation unit.

Referring now to FIG. 4 there is shown a functional block circuit diagram of the circuitry of the interrogation unit 1. The block circuit diagram is divided into three sections being respectively a computer board section 31 a front panel 32 and a display board section 33.

Figure 5:
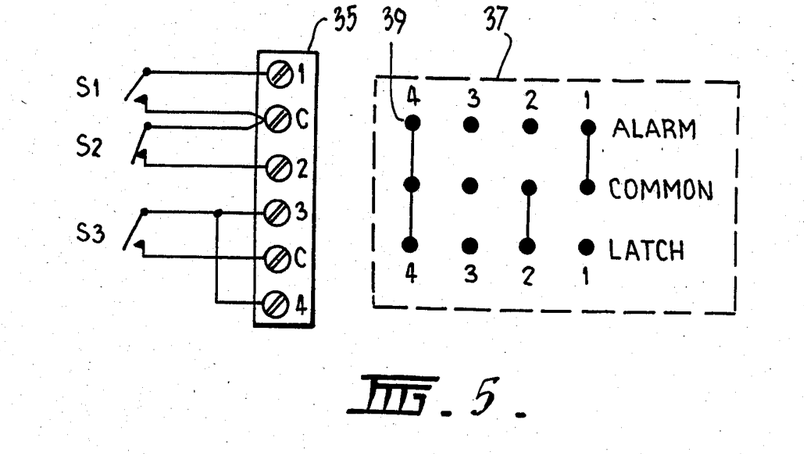
FIG. 5 is a close-up view of part of the front panel of the interrogation unit shown in FIG. 1 showing various sensor connections.

Referring now to FIG. 5 there is shown an input sensor connection terminal board 35 and a strapping pad 37. The sensor terminal connections are shown for one group only. Similarly the strapping pad 37 connections are shown for one group only. In each of the sensor terminal boards 35 there are shown connections for each of the sensors 1 through 4. It can be observed that there are terminals designated C which are common for sensors 1 and 2 and for 3 and 4 respectively. Various switches $S_1$, $S_2$ and $S_3$ have been shown connected to the terminals. It can be observed that there are only three switches shown and that the third switch is interconnected to the fourth switch terminal. The strapping pad 37 has four vertical rows of strapping terminals 39 designated 1, 2, 3 and 4 respectively. There are three horizontally extending rows of strapping terminals 39 designated alarm, common and latch. Each of the vertical rows 1, 2, 3 and 4 may be connected in various patterns as shown. With the connections of sensors $S_1$, $S_2$ and $S_3$ being as shown in FIG. 5 and with the strapping pad 37 being connected as shown in FIG. 5, a short circuit at sensor 1 would cause a corresponding sensor indicator 11, in the form of light emitting diode on the front panel 3 to be illuminated. Because of the connections provided on the strapping pad 37 at vertical row 1, an alarm output will be activated when $S_1$ is closed. When sensor $S_1$ is re-opened, the sensor indicator 11 for S will switch off. If sensor $S_2$ is opened it will cause the corresponding indicator 11 for that sensor to be illuminated. If switch $S_2$ returns to its initial position (back to a short circuit condition) the sensor indicator 11 will remain illuminated as this input is strapped for the latch facility as shown by vertical column 2 on the strapping pad 37. A closing of the sensor $S_3$ will cause sensor indicators 11 for each of sensors 3 and 4 to be illuminated and will simultaneously activate an alarm output. When the sensor $S_3$ returns to the original condition then the sensor indicator 11 for sensor 3 will switch off but the sensor indicator 11 for sensor 4 will remain illuminated. This will indicate that sensor S has operated.

Typically the strapping is pre-wired in the interrogation unit 1 and is severed by a user to provide the required configuration in the strapping pad 37. Alternatively patch leads may be provided for producing the required interconnections.

Figure 6:
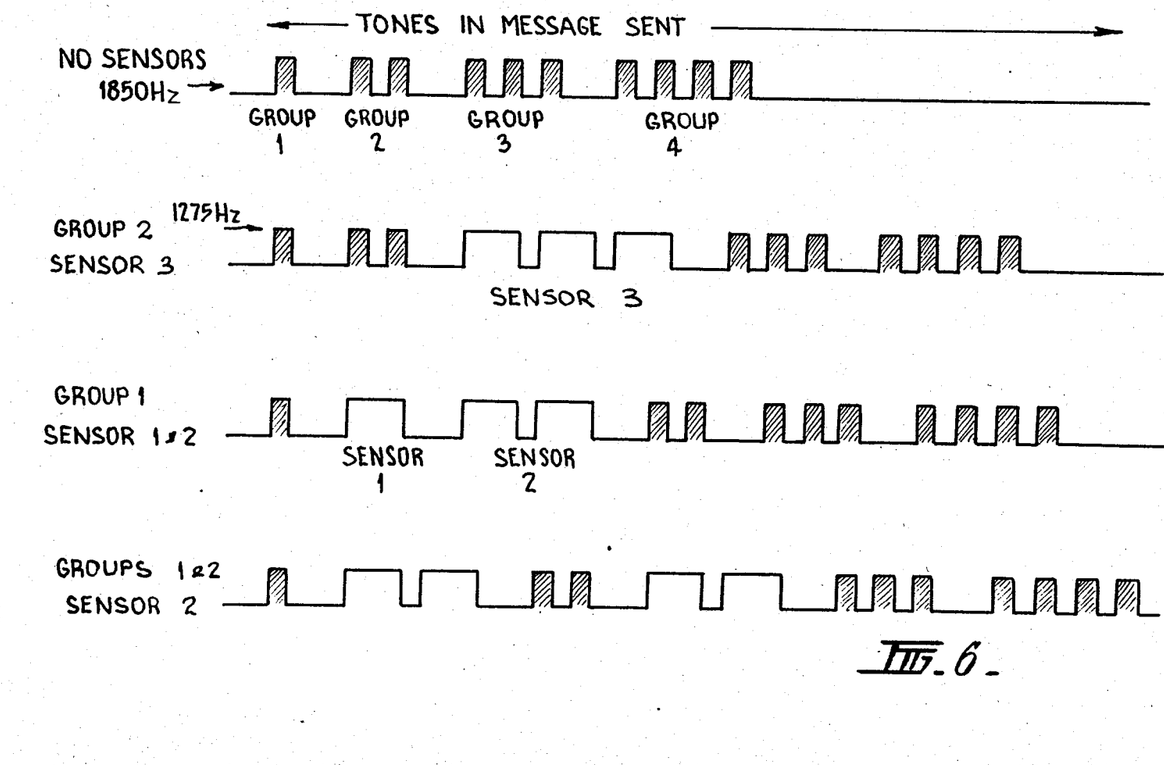
FIG. 6 is a diagram showing tone transmissions for certain sensor conditions.

The types of tones which are transmitted upon interrogation are broadly outlined in FIG. 6. It should be noted that code signals are sent in bursts representative of each group of sensors. A group code signal for group one is provided by a 0.5 second signal burst of one frequency, as for example, 1,850 hertz. The code signals for groups 3 and 4 are three 0.5 second tone bursts and four 0.5 second tone bursts respectively. Each burst is of 1,850 hertz separated by a 0.5 second time period. The code signal for group two is, two 0.5 second tone bursts, of 1,850 hertz, each separated by a 0.5 second time period. A sensor code signal is a 1.5 second signal at a different frequency, as for example, 1,275 hertz. Accordingly in FIG. 6 the tone burst identified as NO SENSORS, shows that a tone burst of 1,850 hertz is transmitted for a duration of 0.5 seconds for group one. Because there are no sensors which have operated in group one, then a group two code signal will be provided 1.5 seconds after the group one signal burst has been completed. The group two code signal comprises two tone bursts each of 1,850 hertz each for a time duration of 0.5 seconds and each being separated in time by 0.5 seconds. As no sensors have operated in group two, a group three code will follow 1.5 seconds later. The group three signal code will be three tone bursts of 1,850 hertz each of 0.5 second duration and each separated by 0.5 seconds. As no sensors in group three have operated then the group four code will follow. This will be sent 1.5 seconds after the group three signals and will comprise four tone bursts each of 1,850 hertz, each for a time duration of 0.5 seconds and each separated by a time of 0.5 seconds.

By referring to the next group of tone signals in FIG. 6, which is identified as GROUP TWO SENSOR 3 it is observed that there is a code signal burst for group one. This is of a 0.5 second time duration and as there are no sensors in group one operating then no sensor code signals will be transmitted. Accordingly after a time duration of 1.5 seconds the code for group two signals will be transmitted. As only sensor 3 has operated in group two a signal for sensor 3 will be transmitted. This will commence 1.5 seconds after the end of the group two code and will comprise three tone bursts. Each of the tone bursts will be at a frequency of 1,275 hertz i.e. a frequency different to that of the group codes. Each of these tone bursts will be for a 1.5 second duration and each will be separated by a 0.5 second time period. As sensor 4 has not operated, no sensor code transmitted representing of that sensor operating. Accordingly after a time duration of 1.5 seconds after the termination of the sensor 3 signal there will be a code transmission for group three, and as no sensors have opened in group three there will be a time duration of 1.5 seconds after which there will be a transmission of the signal code for group four.

By observing the tone bursts for GROUP ONE SENSORS 1 and 2 it can be observed that there will be a tone burst representing group one, for a time duration of 1.5 seconds followed by a sensor code signal comprising a single tone burst of 1.5 seconds duration at a frequency of 1,275 hertz. This will signify that sensor 1 has operated. After a time duration of 1.5 seconds there will be a signal transmission of two tone bursts representing that sensor 2 has operated. These sensor tones will be each of 1,275 hertz of 1.5 seconds duration each with a time delay of 0.5 seconds therebetween. There will then follow a further 1.5 seconds time delay. The code for group three will then be sent and as no sensors in group three have operated there will be a further time delay of 1.5 seconds and then there will be a signal code sent for group four.

By referring to the tone bursts shown as GROUPS ONE AND TWO SENSOR 2, it can be observed that there is a code signal for group one and then a time delay of 1.5 seconds followed by sensor code bursts of two tones each of 1,275 hertz. These tones are separated by a 0.5 seconds time period. After this transmission there is a time delay of 1.5 seconds where upon the signal code for group two is transmitted. The sensor code signals for indicating sensor 2 are then transmitted and then these are followed by the code for group three and then group four.

It can be observed that each of the groups of sensors can be clearly identified whilst each of the sensors in each of the groups can also be clearly identified by:

(a) the different frequency and duration of codes; and
(b) the number of bursts for each of the codes.

Following interrogation the total signal is transmitted three times and then the interrogation unit 1 is arranged to 'hang-up' and await receipt of the another call before sending further signals.

It should be noted that whilst signals are being transmitted there is a continuous scanning of the inputs from the sensors but this is conducted at a slower rate and the function indicator lamp 19 flashes slowly during this procedure.

Figure 7:
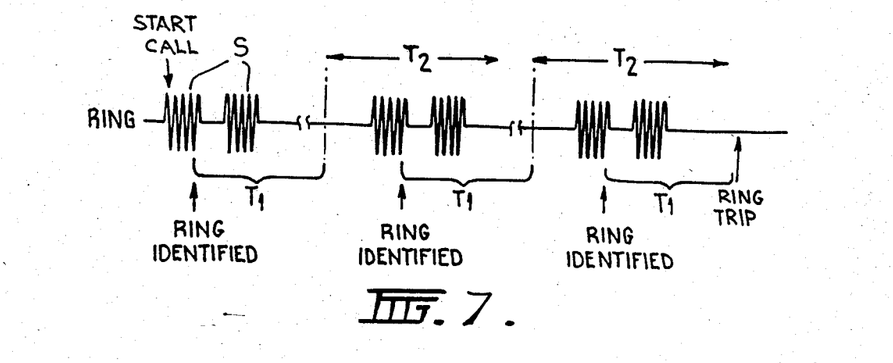
FIG. 7 is a diagram showing ring-tone detection signals.

By referring to FIG. 7, it can be seen how the interrogation unit 1 counts three ringing pulses before answering the line and connecting itself to provide transmission of the required information. It is noted that each burst of ringing tone comprises two ringing signals S. On receipt of an incoming ring signal, the interrogation unit 1 will count four cycles of the first burst of the ring. It will then be placed into a time mode where it will ignore any changing signals on the line for the next two seconds i.e. time T1. When time T1 has elapsed, it will then start a 2 second time out (T2) in which another four cycles of ring burst must be received. This procedure is repeated until the interrogation unit 1 has counted three lots of ring bursts. After the third burst of ring has been received, it will trip itself to transmit signals. Should a ring signal fail to appear during either one of the two T2's then the interrogation unit 1 will abort and register the next received burst of ring as the start of another call. Scanning of all sensor inputs continues during ring detection.

If the handset is lifted off the hook whilst the unit is being interrogated the unit will abort the transmission and disconnect itself from the interrogation call.

Figure 9:
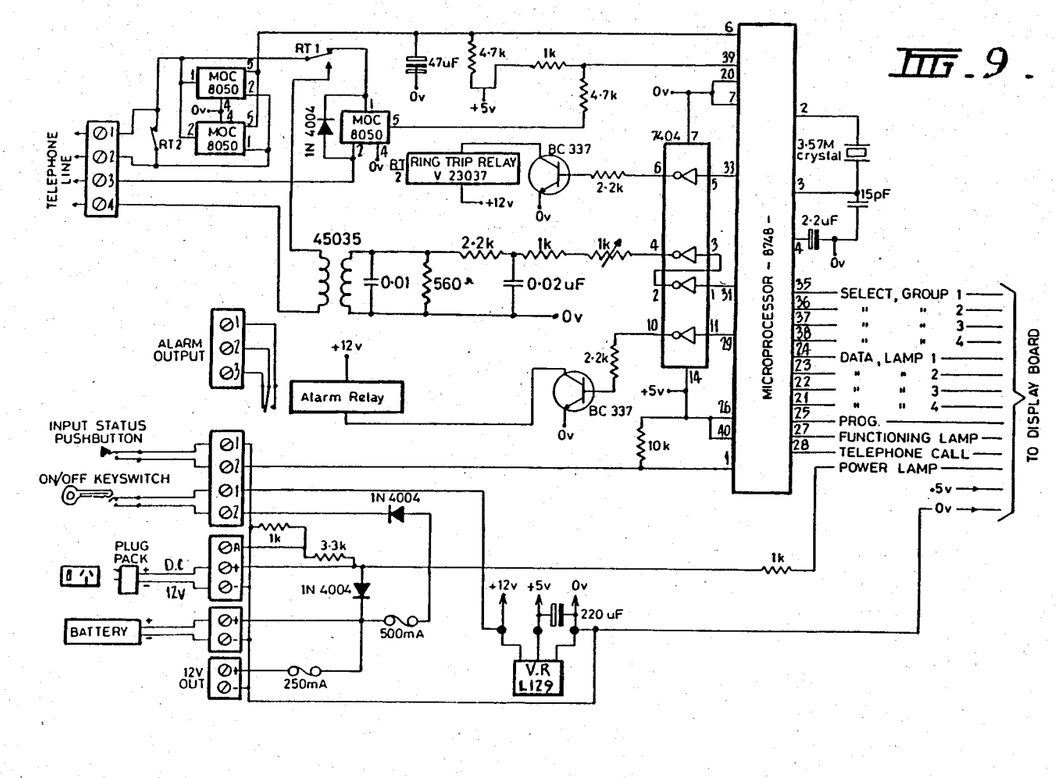
FIG. 9 is a detailed circuit diagram of a computer board part of the interrogation unit.
Figure 10:
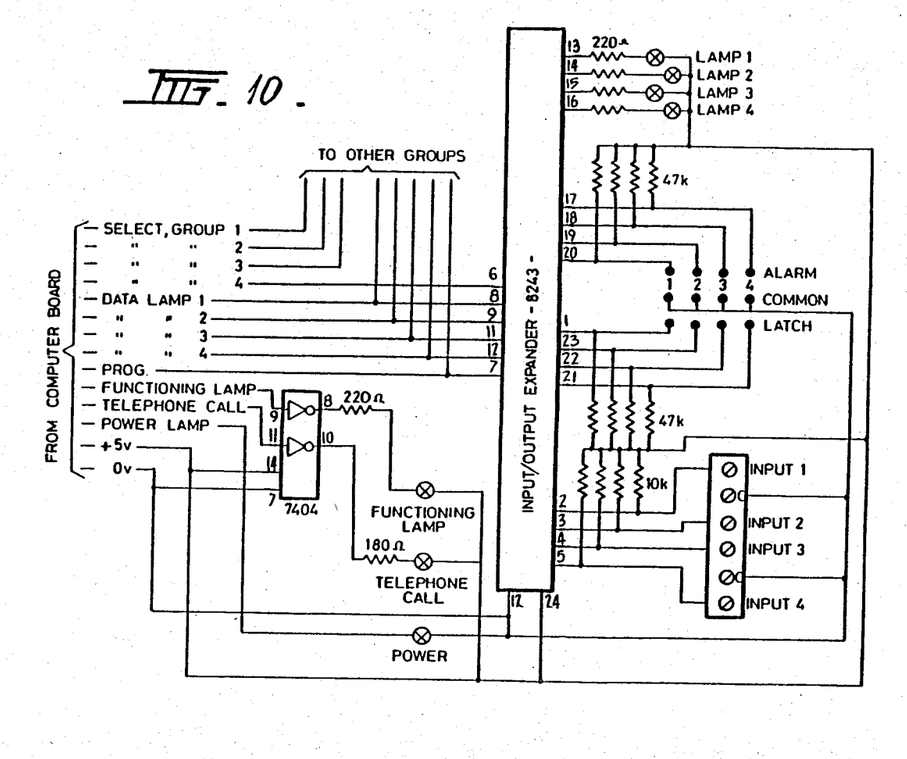
FIG. 10 is a detailed circuit diagram of a display board part of the interrogation unit.
Figure 11A:
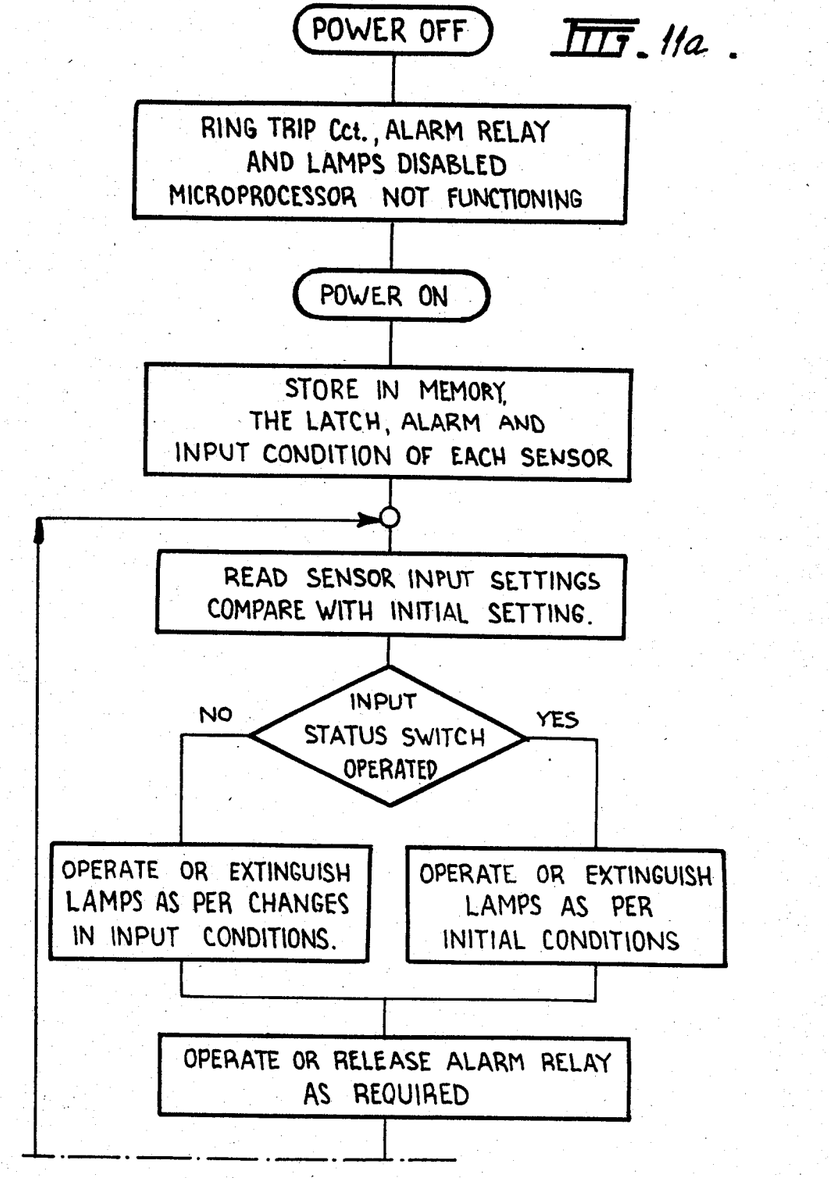
FIGS. 11a and 11b are collectively a simplified flow diagram of the micro processor in the interrogation unit.
Figure 11B:
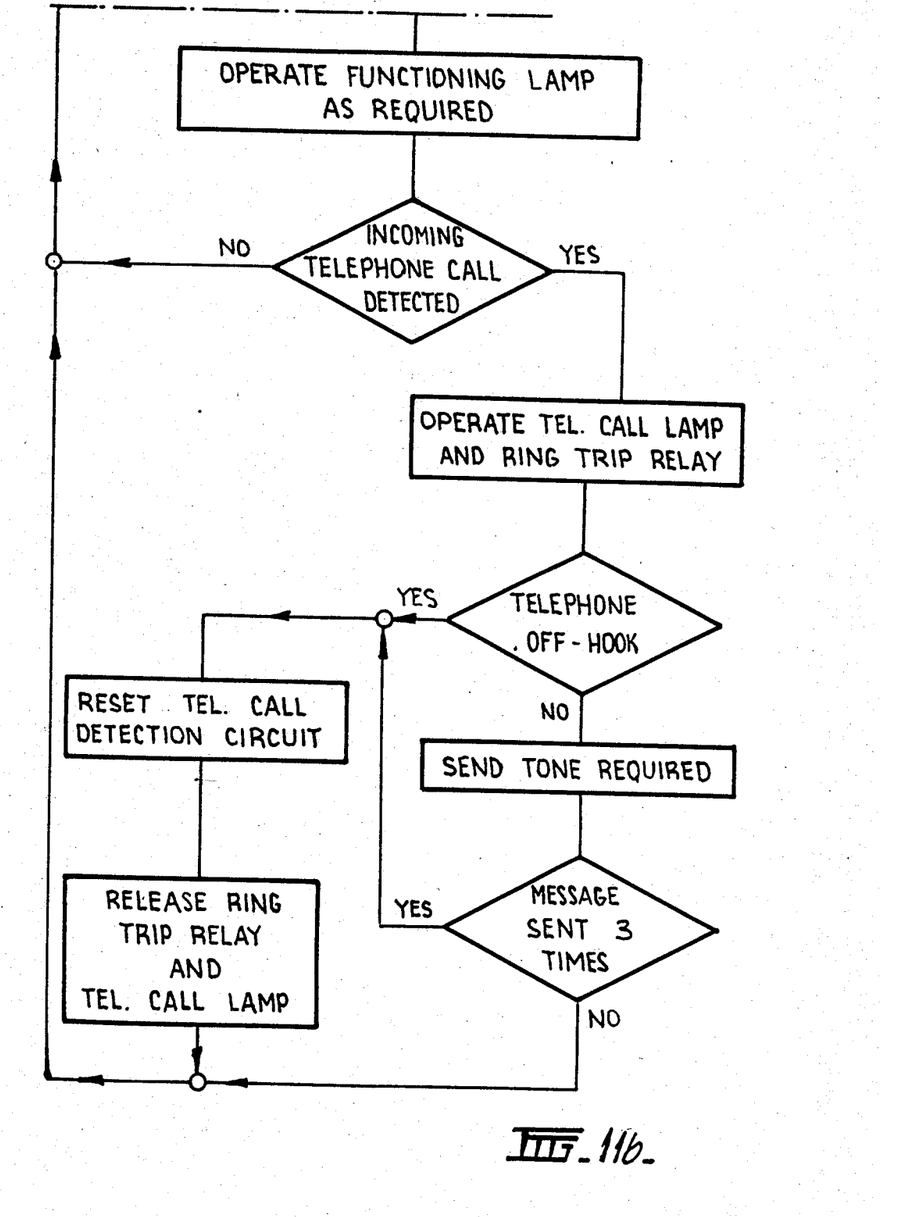

The detailed circuitry of the interrogation unit 1 is shown in FIGS. 9 and 10. The circuitry should be fully comprehended by an electronic addressee. The programme for the microprocessor is shown on a flow diagram in FIG. 11 and can be implemented by a suitable programmer.

Figure 8:
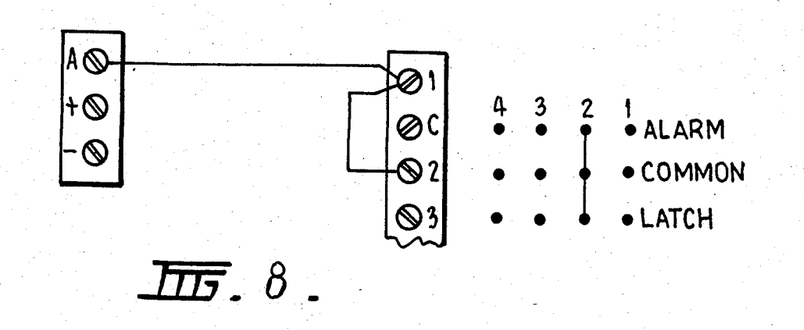
FIG. 8 is a close-up diagram of part of the interrogation unit input terminals showing connection for mains power sensing and/or failure.

By inspecting FIG. 8 it can be seen that the terminals for the supply power to the unit are designated 'A', 't', and '-'. By utilizing terminal 'A' and appropriately connecting it to an unused sensor input it is possible to achieve A.C. mains power sensing. In this connection, terminal 'A' could be connected to sensor 1 terminals and the alarm and latch strappings opened. In this case the A.C. power would be sensed by visual inspection of the indicator lamp 11 for that sensor. Additionally, or alternatively, the terminal 'A' may be connected with sensor 2 terminals and the Alarm and Latch strappings retained. This would then raise an alarm if mains power were interrupted and will provide a lit indicator 11 for that sensor under the latch condition indicating that A.C. power had been disconnected.

Modifications may be made to the embodiment as would be apparent to persons skilled in the art and all such modifications are deemed to be within the nature of the invention as defined by the appended claims.

I claim:

1. An interrogation unit for connecting into an installation via sensing elements connected to sense required information in the installation, said interrogation unit having signal supplying means for supplying signals indicative of the condition of each of various sensors in the installation, and trigger circuit means activatable upon recipt of a request signal to transmit said signals for each of the sensors in turn, said signal supplying means including tone generating means which generates two different tones and being connected to either transmit said tones or not to transmit said tones, whereby to indicate that any particular sensor has changed from its initial condition or not, a first of said tones being used for identifying a group of sensors whilst the second of said tones being used for identifying particular sensors in that group.

2. An interrogation unit as claimed in claim 1 and including a respective latch circuit means associated with the connections for each of the sensors, whereby a user can optionally select to utilize a latch facility or not, said latch circuit means recording a change in the condition of a sensor, so that upon interrogation of the unit a signal will be transmitted representative of the respective sensor having changed from an original condition even if it has returned to the original condition.

3. An interrogation unit as claimed in claim 1 and including an alarm circuit for each sensor whereby a user can optionally select to utilize an alarm facility or not, said alarm circuit being for automatically initiating an alarm if a respective sensor changes from its initial condition independently of the unit receiving a request signal.

4. An interrogation unit as claimed in claim 1 and including visual indicator means for each sensor to visually indicate that said sensors have changed from their initial condition.

5. An interrogation unit as claimed in claim 4 including memory means for storing an initial condition of each sensor upon switching ON of said interrogation unit, thereby providing when accessed by a memory recall thereof, an indication of the original condition of sensors by causing said visual indicators to then indicate the original condition.

6. An interrogation unit as claimed in claim 1 including a microprocessor device for operation of said unit and programmed to scan sensors and to provide regularly updated information as to the condition of said sensors, said microprocessor being programmed whereby to transmit said signals in a sequential manner following said device receiving said request signal and to discontinue transmission of said signals after they have been transmitted a predetermined number of times.

7. An interrogation unit as claimed in claim 1 and connected with sensors in an installation.

8. An interrogation unit as claimed in claim 6 whereby to provide interrogation of said sensors by a telephone call providing said request signal.

9. An interrogation unit for connecting into an installation via sensing elements connected to sense required information in the installation, said interrogation unit having signal supplying means for supplying signals indicative of the condition of each of various sensors in the installation, and trigger circuit means activatable upon receipt of a request signal to transmit said signals for each of the sensors in turn, wherein said signal supplying means include tone generating means which is connected to either transmit said tone or not to transmit said tone, whereby to indicate that any particular sensor has changed from its initial condition or not, and wherein said tone generating means generates two different tones, a first of said tones being used for identifying a group of sensors whilst the second of said tones being used for identifying particular sensors in that group, said signal supplying means providing N bursts of said second of said tone signals for sensor N, and N+1 bursts for sensor N+1, whereby to identify sensors in the transmission by counting the number of tone bursts.

10. An interrogation unit as claimed in claim 9 wherein said signal supplying means providing N bursts of said first of said tone signals for group N, and N+1 bursts fro group N+1, whereby to identify groups in the transmission by counting the number of tone bursts.

* * * * *